Oct. 30, 1962    V. J. CHIPPERFIELD    3,061,249
FLOATING MEANS
Filed May 10, 1960    2 Sheets-Sheet 2

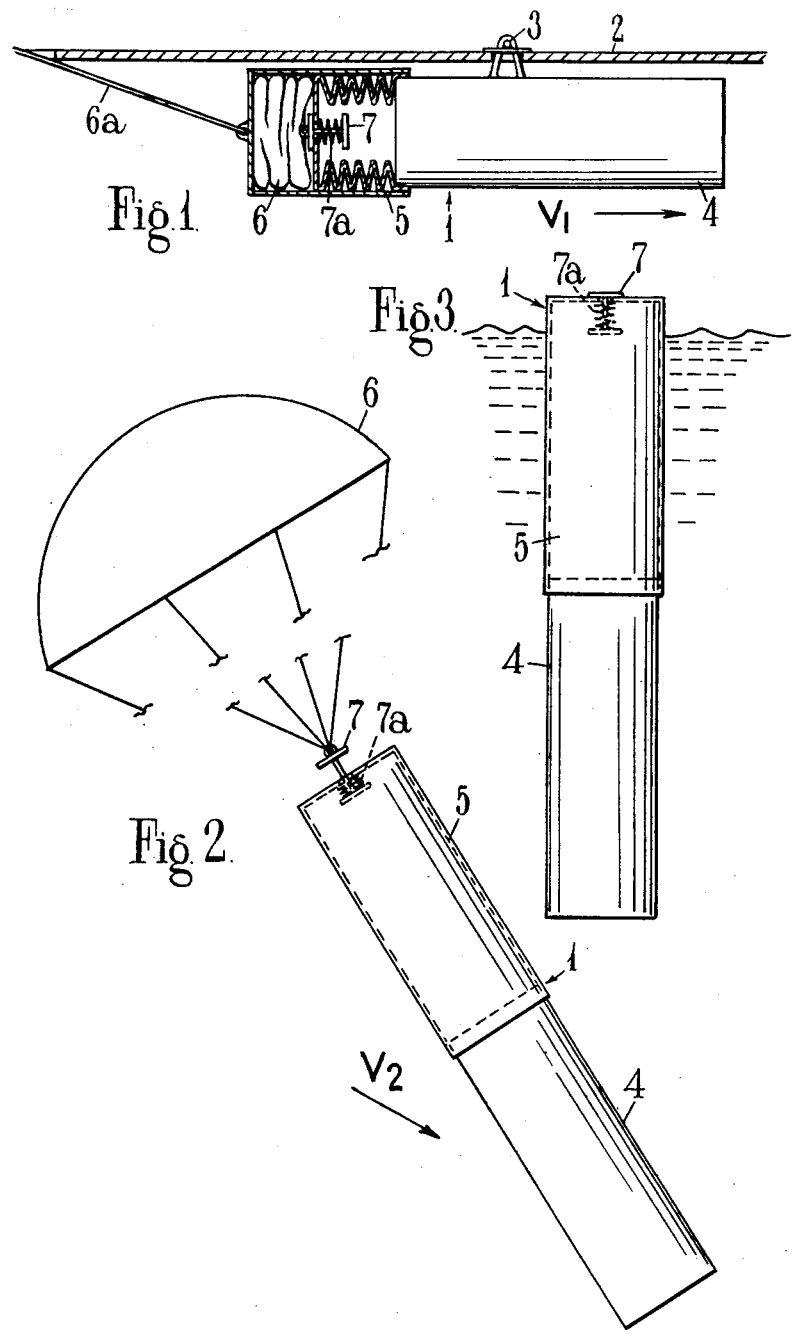

Inventor
V. J. Chipperfield
By Glascock Downing Seebold
Attys.

3,061,249
FLOATING MEANS
Victor James Chipperfield, Acton, England, assignor to Ultra Electronics Limited, Acton, England
Filed May 10, 1960, Ser. No. 28,162
Claims priority, application Great Britain May 22, 1959
2 Claims. (Cl. 244—138)

This invention relates to equipment of a kind adapted to be dropped from aircraft into the sea, there to float. One such known equipment is the Sonobuoy, an equipment which, being dropped into the sea, floats on the surface where a transmitter with erected aerial transmits signals corresponding to the sounds received on a hydrophone or other sound detector which has descended below the surface.

The obvious form of float for such an equipment is of course an air-filled sealed canister; but by its nature such a canister is bulky, and may take up far too much of the stowage space available in the aircraft. Therefore, an alternative arrangement has been to use a rubber bag which is inflated on impact by the chemical generation of gas, or release of compressed gas. Such arrangements have proved somewhat unreliable.

The object of this invention is to provide a float which occupies the minimum of space while the equipment is in the aircraft and which is more reliable in operation than those available hitherto.

The invention conisists in floating equipment for aircraft conveyance comprising an article to be floated, a normally collapsed float secured thereto, an air fall retarding device mounted therein, and a spring loaded valve provided in the float and connected with the retarding device so as to be opened thereby during descent to allow air to pass into the float to provide the necessary flotation.

The retarding means is most conveniently a parachute but in specific cases a static line attached to the aircraft or a roto-chute with rotating arms may be used. Further, the retarding means may be an aperture into which ram air is forced by the velocity through the air.

The float may be a collapsible bag or bellows or may be a telescopic sleeve surrounding an elongated body containing the equipment, having a seal with a self-locking pawl to lock it in the extended position. The invention may be further described with reference to the embodiments shown in the accompanying drawings in which:

FIGURE 1 represents the floating unit attached to the aircraft.

FIGURE 2 represents the floating unit while falling.

FIGURE 3 represents the floating unit in the water with the float fully extended.

Figure 4:
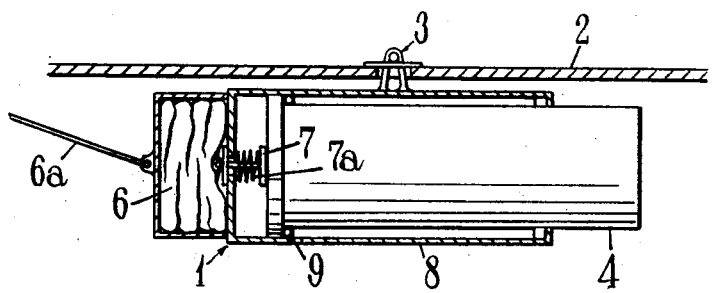
FIGURE 4 represents the floating unit using a collapsible float of telescopic form and different from that shown in FIGURE 1.

The floating unit 1 is attached by releasable attaching means 3 to the body of an aircraft 2, and is divided into three main portions; 4 containing the essential equipment of the floating unit such as a hydrophone, 5 being the float, and 6 the air fall retarding device, i.e. a parachute, shown stowed in FIGURES 1 and 4 and open in FIGURE 2. The parachute is normally opened by a static line 6a connected to the aircraft.

The float 5 is provided with a one way valve 7, biassed into a closed position by spring 7a, situated for convenience at the top of the floating body, which allows air to pass into the float.

As shown in FIGURE 1 the float is a collapsible bag or bellows, but it may also be a telescopic sleeve 8 (FIGURE 4) surrounding the equipment 4 and provided with a seal with a self locking pawl 9 which comes into operation when the sleeve 8 is fully extended.

Figures 5, 6:
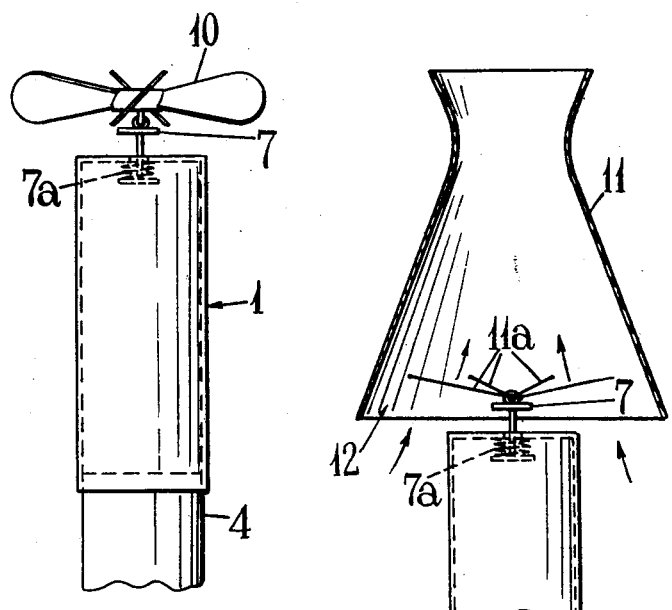
FIGURE 5 shows the falling equipment attached to a roto-chute.
FIGURE 6 shows the falling equipment attached to a device having apertures for ram air.

In place of the parachute 6 the retarding device can comprise roto-chute 10 (FIGURE 5) or a substantially conical device 11 (FIGURE 6) secured to valve 7 by stays 11a which has apertures 12 into which ram air is forced to provide the necessary retarding force. In specific cases the static line 6a can be used as the retarding device.

The equipment operates as follows;

The aircraft is moving with a velocity $V_1$ when the unit 1 is detached. At the time when the static line opens the parachute 6, the velocity of the store along its own axis is $V_2$ which is greater than the terminal velocity dropping vertically and less than $V_1$. As the drag of the parachute is approximately equal to the square of the velocity through the air, the initial force available to provide the necessary extension is of considerable magnitude, and will normally exceed the weight of the store by the factor of two or three times.

Accordingly the drag of the parachute will open the spring loaded sealing valve 7 and extend the float 5 to its full extent.

The spring valve will close again after the device reaches the water i.e. after the parachute load is reduced to zero, as shown in FIGURE 3. Conveniently the parachute cords may be arranged to become disconnected when they become slack.

Various modifications may be made within the scope of the invention.

I claim:

1. Equipment for aircraft conveyance and dropping comprising an article to be floated in water, a normally collapsed float secured thereto, at least one valve provided on the float and operable between a closed position in which the float is sealed and an open position, an air-fall retarding device secured to the valve and operative when the equipment is released from an aircraft to pull the valve into the open position and the float into the expanded position thus filling the float with atmospheric air, and spring means mounted on the valve for closing the valve to reseal the float when the pull of the air-fall retarding device thereon is released.

2. Equipment as claimed in claim 1 in which the float comprises a device for locking it in the expanded position.

References Cited in the file of this patent

UNITED STATES PATENTS

| | | |
|---|---|---|
| 1,964,016 | Wiley | June 26, 1934 |
| 2,036,279 | King | Apr. 7, 1936 |
| 2,334,211 | Miller | Nov. 16, 1943 |
| 2,368,258 | Manson | Jan. 30, 1945 |
| 2,377,587 | Strong | June 5, 1945 |
| 2,495,486 | Stevenson | Jan. 24, 1950 |
| 2,629,083 | Mason et al. | Feb. 17, 1953 |
| 2,706,605 | Rose et al. | Apr. 19, 1955 |
| 2,887,055 | Bagdanovich et al. | May 19, 1959 |

FOREIGN PATENTS

| | | |
|---|---|---|
| 777,495 | Great Britain | June 26, 1956 |